(12) United States Patent
Hottinen

(10) Patent No.: US 8,149,756 B2
(45) Date of Patent: Apr. 3, 2012

(54) METHOD, APPARATUS AND COMPUTER PROGRAM PRODUCT PROVIDING RANDOMIZED RELAY NETWORK

(75) Inventor: Ari Hottinen, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 1620 days.

(21) Appl. No.: 11/486,833

(22) Filed: Jul. 14, 2006

(65) Prior Publication Data

US 2007/0150928 A1 Jun. 28, 2007

Related U.S. Application Data

(60) Provisional application No. 60/699,786, filed on Jul. 14, 2005.

(51) Int. Cl.
*H04B 7/14* (2006.01)

(52) U.S. Cl. ........ 370/315; 370/492; 370/501; 370/243; 370/246; 455/13.1; 455/11.1; 455/12.1; 455/13.2

(58) Field of Classification Search .................. 455/13.1, 455/7–10, 11.1, 12.1, 13.2, 13.3, 13.4, 14–25; 370/315–327, 492, 501, 243, 246, 274, 273
See application file for complete search history.

(56) References Cited

U.S. PATENT DOCUMENTS

2004/0266339 A1* 12/2004 Larsson ............................ 455/7

OTHER PUBLICATIONS

"Randomized Distributed Space-Time Coding for Cooperative Communication in Self Organized Networks", Sirkeci-Mergen, B. et al., 2005 IEEE 6th Workshop on Signal Processing Advances in Wireless Communications, Jun. 5-8, 2005, pp. 500-504, ISBN: 0-7803-8867-4, INSPEC: 8670231, XP010834469.
A. Wittneben, I. Hammerstroem, and M. Kuhn, "Joint Cooperative Diversity and Scheduling in Low Mobility Wireless Networks," *IEEE Global Telecommunications Conference*, Globecom 2004, Nov. 2004.
I. Hammerstroem, M. Kuhn, and A. Wittneben, "Channel Adaptive Scheduling for Cooperative Relay Networks," *IEEE Vehicular Technology Conference*, VTC Fall 2004, Los Angeles, Sep. 2004.
I. Hammerstroem, M. Kuhn, A. Wittneben, "Cooperative Diversity by Relay Phase Rotations in Block Fading Environments," *Signal Processing Advances in Wireless Communications*, SPAWC 2004, pp. 5, Jul. 2004.
T. Heikkinen, T. Karageorgos, A. Yao, and A. Hottinen, "Delay-Differentiated Scheduling in a Wireless Network," in *Proc. VTC 2005*, Stockholm, Sweden, May 2005.
T. Heikkinen, T. Karageorgos and A. Hottinen, "Distributed Scheduling in a Time-Varying Channel" in *Proc. VTC 2005*, Stockholm, Sweden, May 2005.

* cited by examiner

*Primary Examiner* — Kamran Afshar
*Assistant Examiner* — Sayed T Zewari
(74) *Attorney, Agent, or Firm* — Harrington & Smith

(57) ABSTRACT

A relay node is provided for being interposed between at least one source node and at least one destination node. The relay node includes a receiver, a transmitter and a control unit. A transmission signal transmitted by the at least one source node is received by the relay node and modified by the control unit in a substantially pseudo-random manner to generate a time-varying signal that is transmitted by the relay node to the at least one destination node.

47 Claims, 8 Drawing Sheets

METHOD, APPARATUS AND COMPUTER PROGRAM PRODUCT PROVIDING RANDOMIZED RELAY NETWORK

CROSS-REFERENCE TO RELATED APPLICATIONS

This patent application claims priority under 35 U.S.C. §119(e) from Provisional Patent Application No. 60/699,786, filed Jul. 14, 2005, the disclosure of which is incorporated by reference herein in its entirety.

TECHNICAL FIELD

The exemplary and non-limiting embodiments of this invention relate generally to wireless communications systems such as, but not limited to, code division multiple access (CDMA), wideband CDMA (WCDMA), orthogonal frequency division multiplex (OFDM) and Digital Video Broadcast (DVB) systems.

BACKGROUND

Collaborative relays may be used as "new network elements" or as "transparent network elements". When used as new network elements it is likely that signaling concepts and/or resource allocation concepts need to at least be partially redefined. In contrast, transparent relay nodes may be (ideally) placed in the wireless network so that they increase the network capacity in such a way that (ideally) the network (or terminals) are unaware of their existence.

One transparent solution may utilize in-band relaying, where at least in part the same frequency is used at the relay input and relay output at essentially the same time. In this case the relay nodes may be added to a wireless system without the need to redesign the base station (transmitter) or the terminals. In such a system the loop interference in amplify and forward relays may be controlled by reducing the relay transmit energy, as perceived at the relay node input. This may be accomplished by separating the receive antennas and transmit antennas from each other (physically or via beamforming). This type of relaying approach is currently being used in DVB-H (test) networks. In addition to DVB-H, this concept is applicable as an add-on feature to prevailing wireless systems, such as WCDMA, or in various OFDM-based systems.

Two-hop solutions have been discussed by A. Wittneben, I. Hammerstroem, and M. Kuhn, "Joint Cooperative Diversity and Scheduling in Low Mobility Wireless Networks," *IEEE Global Telecommunications Conference, Globecom* 2004, November 2004; I. Hammerstroem, M. Kuhn, and A. Wittneben, "Channel Adaptive Scheduling for Cooperative Relay Networks," *IEEE Vehicular Technology Conference, VTC Fall* 2004, Los Angeles, September 2004 and I. Hammerstroem, M. Kuhn, and A. Wittneben, "Cooperative Diversity by Relay Phase Rotations in Block Fading Environments," *Signal Processing Advances in Wireless Communications, SPAWC* 2004, pp. 5, July 2004. In these publications, different time slots are used at the relay for reception and transmission.

SUMMARY

In an exemplary aspect of the invention, a relay node is provided for being interposed between at least one source node and at least one destination node. The relay node includes a receiver, a transmitter and a control unit. A transmission signal transmitted by the at least one source node is received by the relay node and modified by the control unit in a substantially pseudo-random manner to generate a time-varying signal that is transmitted by the relay node to the at least one destination node.

In another exemplary aspect of the invention, a relay node is provided for being interposed between at least one source node and at least one destination node. The relay node includes a receiver, a transmitter and a control unit. A transmission signal transmitted by the at least one source node is received by the relay node and modified by the control unit to generate a time-varying signal that is transmitted by the relay node to the at least one destination node. A complex channel $h_{23}$ between the relay node (node 2) and the at least one destination node (node 3) is modified at a time slot t to:

$$\tilde{h}_{23}[t] = \sqrt{p_2[t]} w_2[t] h_{23}$$

where $p_2[t]$ is a transmit power of the relay node and $w_2[t]$ is a unit-power complex-valued coefficient applied at the relay node. Factors $\sqrt{p_2[t]} w_2[t]$ are selected such that a received signal power is made to combine coherently at the at least one destination node and a received noise power is made to combine incoherently at the at least one destination node.

In a further exemplary aspect of the invention, a relay device is provided. The relay device includes control means coupled to a receiver and a transmitter, said control means for modifying a received signal in a substantially pseudo-random manner to generate a time-varying signal that is transmitted by the relay device. A complex channel $h_{23}$ between the relay device (node 2) and at least one destination node (node 3) is modified at a time slot t to:

$$\tilde{h}_{23}[t] = \sqrt{p_2[t]} w_2[t] h_{23}$$

where $p_2[t]$ is a transmit power of the relay device and $w_2[t]$ is a unit-power complex-valued coefficient applied at the relay device.

In another exemplary aspect of the invention, a wireless communication system is provided. The wireless communication system includes a plurality of relay nodes interposed between at least one source node and at least one destination node. Each relay node of the plurality of relay nodes includes a receiver, a transmitter and a control unit, wherein each relay node is enabled to receive and modify a transmission signal transmitted by the at least one source node, said modification being in a substantially pseudo-random manner to generate a time-varying signal that is transmitted by the relay node performing the modification. The relay node performing the modification is an in-band relay node.

In a further exemplary aspect of the invention, a method is provided for relaying a signal. The method includes the steps of: receiving a transmission signal; modifying the received transmission signal in a substantially pseudo-random manner to generate a time-varying signal; and transmitting the time-varying signal.

In another exemplary aspect of the invention, a computer program product is provided. The computer program product comprises program instructions embodied on a tangible computer-readable medium. Execution of the program instructions results in operations including: receiving a transmission signal; modifying the received transmission signal in a substantially pseudo-random manner to generate a time-varying signal; and transmitting the time-varying signal.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The exemplary embodiments of this invention pertain to a signal relaying concept for wireless communication systems. In the exemplary embodiments of the invention, directed to in-band relaying, at least one relay node pseudo-randomly varies the transmission signal in order to generate a time-varying (e.g., a cyclostationary) received signal at the target node (e.g. destination receiver). The induced cyclostationarity is used to schedule the transmission in, for example, frequency, subcarrier and/or time so that the signal is transmitted when the received effective signal quality is high.

In contrast to the prior art, the exemplary embodiments in accordance with this invention may operate also with in-band relaying, where the signal is transmitted substantially simultaneously while receiving the signal from the source (e.g. the transmission signal and the signal transmitted by the relay are received by the target node substantially simultaneously). Such a configuration is known to be currently used in at least one DVB-H network in order to extend the coverage of broadcast services. Such a relay network is also useful in other wireless networks, in particular in networks where channel-aware scheduling (e.g., time, frequency) may be used.

In contrast to the prior art, new methods for generating time-varying transmission signal are detailed in the exemplary embodiments, so that the relay input signal and relay output signals are transmitted using different, substantially orthogonal channels defined in, for example, time and/or frequency. The randomization techniques in accordance with the exemplary embodiments enable the control or equalization of the properties of the time-varying channel, as observed at the destination, so that channel estimation and related resource allocation functions are simplified. In these networks, the relayed signal may be transmitted at a different time slot and/or using a different frequency channel (or subcarrier) than what was used to transmit from the source to the relay.

Figure 1:
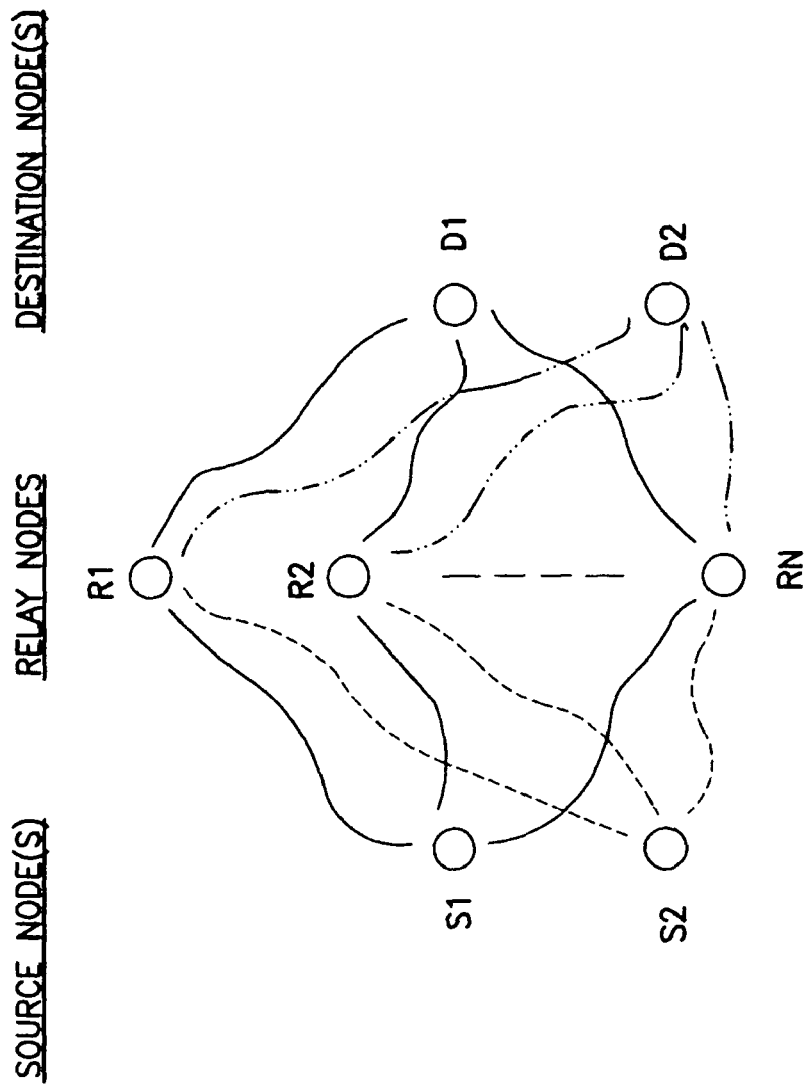
FIG. 1 shows an example of a relay network.

FIG. 1 shows a non-limiting example of a relay network with two source nodes (S1, S2), N relay nodes (R1, R2, . . . , RN) and two destination nodes (D1, D2). In such a system, and referring also to FIG. 8A, assume that a network that has a source node (Node 1), a relay node (Node 2) and a destination (DEST) node (also designated below as Node 3, when only one relay is present). Consider an in-band amplify and forward relay network where the received signal at Node 3 (destination node) is $$y = h_{13}x + h_{23}[h_{12}x + n_2] + n_d, \quad (1)$$

where $h_{lk}$ is the complex channel between Node k and Node l, and $n_k$ is the noise at the receiver of Node k, and $n_d$ noise at destination. Here, the signal from the source to the destination is summed together with the relayed signal, since the signals are assumed to arrive substantially simultaneously at the destination on the same frequency channel. If they were to arrive instead via orthogonal channels, the receiver would separate the received signals, one from source and one from the relay or relays. These can be combined at the receiver using known techniques.

Assume, without restricting the scope of this invention, that substantially simultaneous reception using in-band relaying is used. Then, with multiple relay nodes, the signal model (1) is augmented to:

$$y = h_{1d}x + \sum_{k=2}^{K} + h_{k3}[h_{1k}x + n_k] + n_d. \quad (2)$$

Figure 8A:
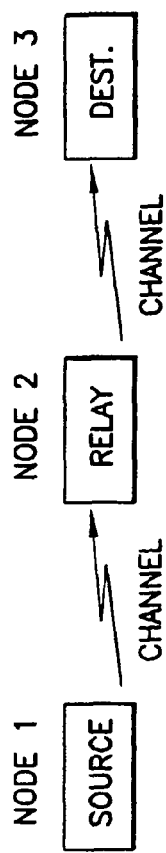
FIG. 8A shows a simplified three node network.
Figure 8B:
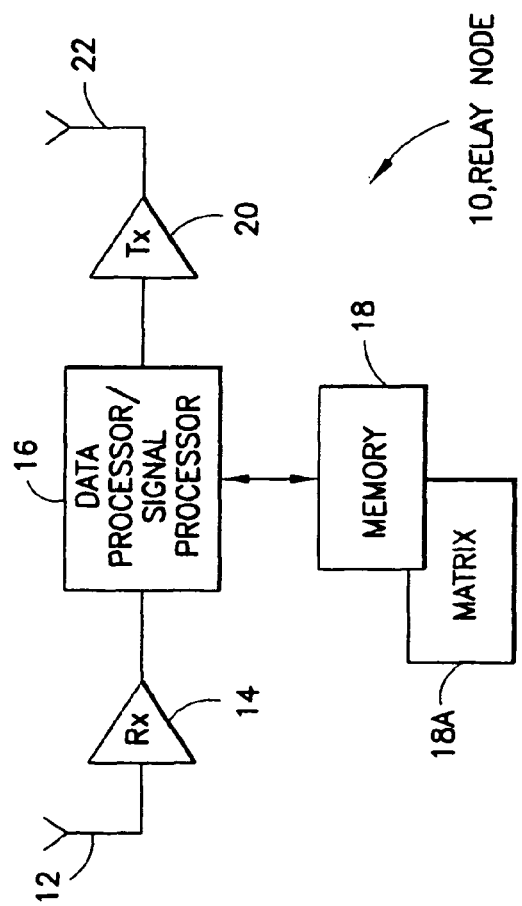
FIG. 8B is a simplified block diagram of a relay node in accordance with the non-limiting embodiments of the invention.

FIG. 8B shows an example of a relay node (Node 2) of FIG. 8A. The relay node (referenced as relay node 10 for convenience) includes at least one receive antenna 12, at least one receiver 14, a data and/or signal processor 16, such as a digital signal processor (DSP), a memory 18 wherein program code is stored for operating the processor 16, at least one transmitter 20 and at least one transmit antenna 22. It may be noted that the source Node 1 may be constructed in a somewhat similar manner, and will include at least the at least one transmitter 20 and transmit antenna(s) 22, and the destination Node 3 may also be constructed in a somewhat similar manner, and will include at least the receive antenna(s) 12 and the at least one receiver 14.

The memory 18 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The data processor 16 may be of any type suitable to the local technical environment, and may include one or more of general purpose computers, special purpose computers, microprocessors, digital signal processors (DSPs) and processors based on a multi-core processor architecture, as non-limiting examples.

In the exemplary embodiments in accordance with this invention, at least one of Node 1 or one of the relay nodes (Node 2), contains in the memory 18 a channel modification factor (or matrix 18A), so that the effective channel, for example the channel between Node 2 and Node 3 (destination), is modified at time slot t to:

$$\tilde{h}_{23}[t] = \sqrt{p_2[t]} w_2[t] h_{23}, \quad (3)$$

where $P_2[t]$ is the transmit power of Node 2 and $w_2[t]$ is a unit-power complex-valued coefficient applied at Node 2, before the signal is transmitted to Node 3. Similar time-varying coefficients may be applied in other nodes as well.

The received signal power may be readily computed to be:

$$SignalPower = \left| \tilde{h}_{13} + \sum_{k=1}^{K} \tilde{h}_{1k} \tilde{h}_{k3} \right|^2 \quad (4)$$

and the noise power as $$NoisePower = 1 + \sum_{k=1}^{K} |\tilde{h}_{k3}|^2, \quad (5)$$

assuming (for simplicity) that all receivers have unity noise power. The signal-to-noise ratio at destination Node is SignalPower/NoisePower.

The equations above show that with appropriate selection of factors $\sqrt{p_k[t]} w_k[t]$ the signal power can be made to combine coherently at the destination, whereas the noise power combines incoherently. Note that the noise power at the destination is still affected by the noise at the relay nodes and by the transmit power at these relay nodes.

In a particular case, if relay k is required to transmit at unit power, then $$p_k[t] = 1/(|\tilde{h}_{1k}|^2 + E(n_k)^2).$$

Thus, the transmit power of the relay node (Node 2) is affected by both the noise power and the received signal power. Naturally, the relay transmit power may also depend on other factors. Here, the input signal-to-noise ratio at relay k is designated by $SNR_{1k} = |\tilde{h}_{1k}|^2/E(n_k)^2$. Hereafter, the noise power is assumed to be one so that the SNR is dictated by $\tilde{h}_{1k}$, which may be controlled by adjusting the transmit power of the source node, and is affected by the propagation channel between the nodes.

Clearly, if the channel power $|\tilde{h}_{1k}|^2$ is zero the relay forwards only noise, and this has an adverse effect on received signal quality at the destination. Conversely, if the input channel is perfect, no noise amplification takes place thus enabling, for example, perfect beamforming. Moreover, this case is analogous to decode-and-forward relaying with perfect signal detection at the relay node. Likewise, one may define the quality between the relay nodes and the destination to be $SNR_{kd} = |\tilde{h}_{kd}|^2/E(n_d)^2$. This may be controlled again by adjusting the relays transmit power, and is naturally affected by the propagation channel.

In a particular randomized beamforming, the sequence $\sqrt{p_k[t]} w_k[t]$ is different for at least two transmitting relay nodes and, in addition, for each transmitting relay node there either exists t when the phase of $w_k[t] \neq 0$, or there exists t,t' when the non-zero transmit powers are different, i.e., $p_k[t] \neq p_k[t']$, $t' \neq t$. The latter constraints are in contrast to equations (13)-(15) in the publication noted above, I. Hammerstroem, M. Kuhn, and A. Wittneben, "Cooperative Diversity 0by Relay Phase Rotations in Block Fading Environments," *Signal Processing Advances in Wireless Communications, SPAWC* 2004, pp. 5, July 2004, since in this publication the first relay "phase" is always zero. The new randomization methods are particularly beneficial for in-band relay networks, and the original source signal is assumed to have no intentional phase rotation.

Consider a relay configuration with K relays. At time t relays k=1, ..., K transmit signals $$\{\exp(j\delta(k)t)x[t]\}_{k=1}^{K},$$

where x[t] is the relay output signal (generated by amplify and forward, decode and forward, estimate and forward, etc.) and the receiver obtains:

$$y[t] = \sum_{k=1}^{K} h_{k3}[t] \exp(j\delta(n-1)t)x[t] + n[t], \quad (6)$$

where $\delta > 0$ determines the phase sweep step size and $h_n$ is the complex channel amplitude between relay n and the receiver antenna. The receiver experiences a linear combination of the channels, which changes in time to:

$$h[t] = \sum_{k=1}^{K} h_{k3}[t] \exp(j\delta(k-1)t). \quad (7)$$

The noise element remains statistically identical to that given for NoisePower above.

The relay nodes may have a priori designated phase hopping/sweep sequence or period, or the relays may have different sweep frequencies at different times, e.g., so that the different relay transmitters permute their sweep frequencies or randomization patterns. This permutation or shuffling makes different relay locations similar over the long run. Without shuffling, a relay node with a rapid phase hopping, sweep, or offset, that is situated close to one particular source, may always generate a very fast fading channel for this particular source. This would exacerbate channel estimation at the destination and may require an application of rapid resource allocation algorithms. If the same randomization patterns are exchanged across two or more relay locations, the effect of randomization is similar and all source locations are treated more equally.

Alternatively, a continuous (relay/source specific) frequency offset $f_o$ may be applied at the transmitters. In this case, the complex baseband representation of the signal transmitted from relay k is, for example:

$$x[t] \exp\left(j2\pi f_o t \left(\frac{k}{K} - 1\right)\right),$$

where $f_o$ determines the frequency offset. Note that the publications referenced above do not consider a case where a frequency offset is used. The use of the frequency offset delivers a continuous change to the received signal, whereas phase hopping results in discrete received channel states, which may exacerbate channel estimation in the receiver.

More generally, the randomization may be effected having the k th relay modify the transmitted signal at slot/symbol t with the k,t th element of matrix W, where each relay is assumed to have knowledge of its corresponding row by some means. In addition, there may be a set of W matrices, each used at different times or at different (sub)carrier frequencies.

One non-limiting advantage of having such pseudo-random weighting coefficients applied at transmitting nodes is that the same relays may be used simultaneously by several users (possibly with scheduling or multiplexing, as described below). With amplify and forward relaying the input channel affects that eventual received channel (as it is embedded in x[t]) at the destination, whereas with the decode and forward technique, the relay may be implemented so that the input channel (phasing) is meaningless (as long as the signal is detected properly). In this case the relay nodes jointly form multiple virtual scattering points, so that a varying channel is generated even if the transmitter (source node) and the receiver (destination node) are static.

Randomization may also be implemented in the power domain. In contrast to the publications referenced above, where different relay nodes may be activated at different times, the powers may be changed so that there are more, at least two, non-zero transmit powers to select from, e.g., 0, P, P/2, where P>0. The transmission powers may also be changed continuously at each relay node.

In this case a user may then be scheduled to transmit when the "best" relay node is active with high power, and possibly when the signals combine constructively at the destination. Then, with amplify and forward relaying, the noise enhancement is minimized and the relays become asymptotically more beneficial to the system. It should be noted that such a random activation or beamforming without source scheduling could be detrimental to the system, and the cost and benefit tradeoff depends largely on network topology and user locations, factors that are generally considered to be beyond the control of the network operator.

Figure 2:
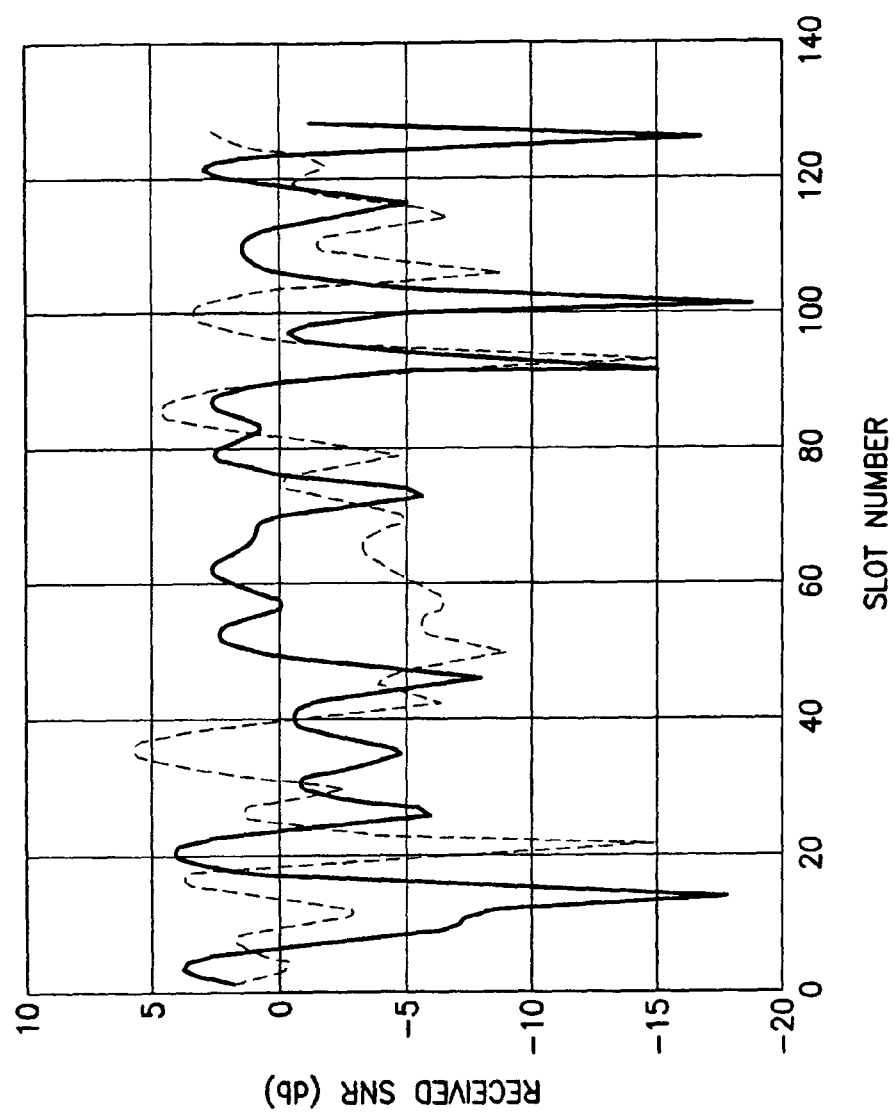
FIG. 2 is a graph that illustrates time-varying received SNR at a Node 3 for two users with randomized beamforming with 15 relay nodes.

Discussing now the scheduling aspect of the non-limiting embodiments of this invention, assume that random beamforming (phase randomization) is used with K=15 relay nodes, and that each channel exhibits unit power with random phase. In one particular phase realization, the received signal for different instances of random relay weighting for two users are depicted in FIG. 2, where it is apparent that the two users should be scheduled to transmit at different times. With amplify and forward relaying the channel varies differently for the two users simply because the input channel to the relay nodes is random, even if the output is identical (i.e., the same relay node is used by the two users).

An algorithm that resolves scheduling in a fair way, using the cyclostationarity of the channel (or known channel), may be formulated as an assignment problem. The input to the problem is a utility matrix with entries $c_{u,t}$, which designates the 'utility' in assigning timeslot t to transmission antenna user u, and these are captured in matrix $C=[c_{m,p}]$. The matrix entries may be the channel powers for each user, e.g., in a manner given in FIG. 2.

Here, the entries may be taken as Shannon capacity, e.g.:

$$c_{u,t} = \log_2\left(1 + \frac{SignalPower_{u,t}}{NoisePower_{u,t}}\right) [bps/Hz]$$

The assignment problem for maximizing the total received signal power is posed as $$\gamma = \max \sum_t \sum_u c_{u,t} x_{u,t}, \quad (8)$$

subject to $$\sum_t x_{u,t} = 1, \forall u, \quad (9)$$

$$\sum_u x_{u,t} = 1, \forall t, \quad (10)$$

and $$x_{u,t} \geq 0, \forall u, t. \quad (11)$$

The optimal solution is known to be integral (permutation of the users to appropriate time slots).

If fairness across users, as defined above, is not of primary interest, alternative formulations and scheduling techniques may be used.

In general, different users may have different delay requirements. To formalize this, let $\phi_i$ denote the portion of a time-window allocated to a user i. Consider the scheduling of users over a time window of length T. This may be formulated as the following linear programming problem (also known as the transportation problem):

$$\max \sum_t \sum_u c_{u,t} x_{u,t}, \quad (12)$$

subject to $$\sum_{t=1}^{T} x_{u,t} = \phi_u T, \forall u, \quad (13)$$

$$\sum_u x_{u,t} = 1, \forall t, \quad (14)$$

$$x_{u,t} \geq 0, \forall u, t, \quad (15)$$

$$\sum_u \phi_u = 1. \quad (16)$$

Problem (12)-(16) can be solved efficiently applying a transportation algorithm.

As in the assignment model above, a scheduling unit that may be located at the destination may determine the transmission channel parameters (e.g. time slot, transmit power) and signal these parameters at least to the source via a signaling channel. The source uses the signaled information to determine transmission resource usage (e.g., time slot, transmission channel) and transmits the signal. The relay or relays may or may not have knowledge of the signaled parameters. If a relay node is able to decode the signaling channel parameters (i.e., it has a receiver tuned for that purpose) it may turn off or reduce its transmit power depending on a parameter or parameters decoded from the signaling channel. For example, a relay node may determine the number of scheduled users and change the transmit power so as to be able to serve all users. In contrast, if all sources are silent (no one scheduled) it may turn off its transmit power completely, so as to minimize potential interference to other receivers in the system.

As for scheduling, for example, one may simply designate to each user (or signal source) the slot where the channel has the highest power, or the highest capacity, or some other measurement that is used as a scheduling criterion. One may allocate multiple time slots to the users or sources that require higher capacity. In place of time-division, alternative multiplexing techniques may be employed. For example, several CDMA or OFDM users may be transmitting simultaneously (allocated to the same time slot), and so on. Furthermore, known scheduling concepts, such as proportionally fair scheduling or delay-differentiated scheduling may be used at the scheduling unit (see, for example, T. Heikkinen, T. Karageorgos, A. Yao and A. Hottinen, "Delay-Differentiated Scheduling in a Wireless Network," in *Proc. VTC* 2005, Stockholm, Sweden, May 2005, and T. Heikkinen, T. Karageorgos and A. Hottinen, "Distributed Scheduling in a Time-Varying Channel" in *Proc. VTC* 2005, Stockholm, Sweden, May 2005). These approaches may be beneficial when the scheduling unit is unaware of the cyclostationary properties ("future values") of the channel. Distributed scheduling is applicable in particular when the scheduling unit is located at a source or at a relay, since then the scheduling unit may not be aware of all scheduling-related information. For example, a source may only know its own channel characteristics, and is then not able to take into account the transmission slots of other users when determining its transmission time or slot. In contrast, if the scheduling unit is at a destination, then it is able coordinate the transmissions of multiple users simultaneously, e.g., all those that it is able to receive.

The techniques in accordance with the exemplary embodiments of this invention may be used either in the uplink or in the downlink. The in-band relay nodes may use any suitable technology to decouple the relay input and output from each other (to mitigate loop interference). The relay randomization patterns may be designed so that the pattern repeats within a desired time interval, which may correspond to a size of an encoded block, or a block size that contains at least some (if not all) coded bits.

In one exemplary case the relay nodes are not controlled for each user separately, but are simple add-on elements, which may be controlled by another network element (e.g., by a base station). The control signals may be used to determine the activity or power of each node, or to disable certain nodes, as non-limiting examples.

The relayed signal x also may be an estimated signal, a detected signal, or a decoded-recoded-remodulated signal, although herein only amplify-forward nodes are explicitly considered.

The advantages that are realized from the use of the non-limiting embodiments of this invention are further apparent from the use of simulations (with and without scheduling), where a direct channel (between nodes 1-3) is assumed to have SNR=0 dB. The SNR of channels 1-2, 2-3 are varied, so that with multiple relays each relay has the same SNR in each link. Similar results can be obtained without the use of this assumption.

The SNR of the direct channel is obtained with transmit power P, analogously for all users. Assume that there are K relays in between the source and the destination, as shown in FIG. 1. The transmit powers of the relays may be zero (e.g. they are switched off) or the transmit powers for source are P/2 and that of each relay is P/(2K), as non-limiting examples. In the two exemplary cases identified, the transmit power of all transmitting nodes is adjusted to maintain the same total power.

The channel may be iid Rayleigh fading overall links. With K>1 relays, the same SNR may be allocated to each relay. Such a case reflects a system wherein the relays are close to each other, with the same average path loss. Other configurations may not be arranged in this manner.

The performance of randomized relaying is first compared to the case where pseudo-random relays are not used, e.g. each relay has zero transmit power. Let the aggregate capacity in such a case be $\gamma_0$ and the aggregate capacity obtained with randomized relays and scheduling be given by equation (8), denoted herein as $\gamma_1$. The figure of merit is the relative capacity increase between the two capacities $\gamma_1/\gamma_0-1$, as plotted in FIGS. 3-7. For example, the contour line labeled 0.2 can be associated with the particular input and output link SNRs so that the capacity is increased by 20% when compared to the case with no relay nodes between source and destination.

Figure 3:
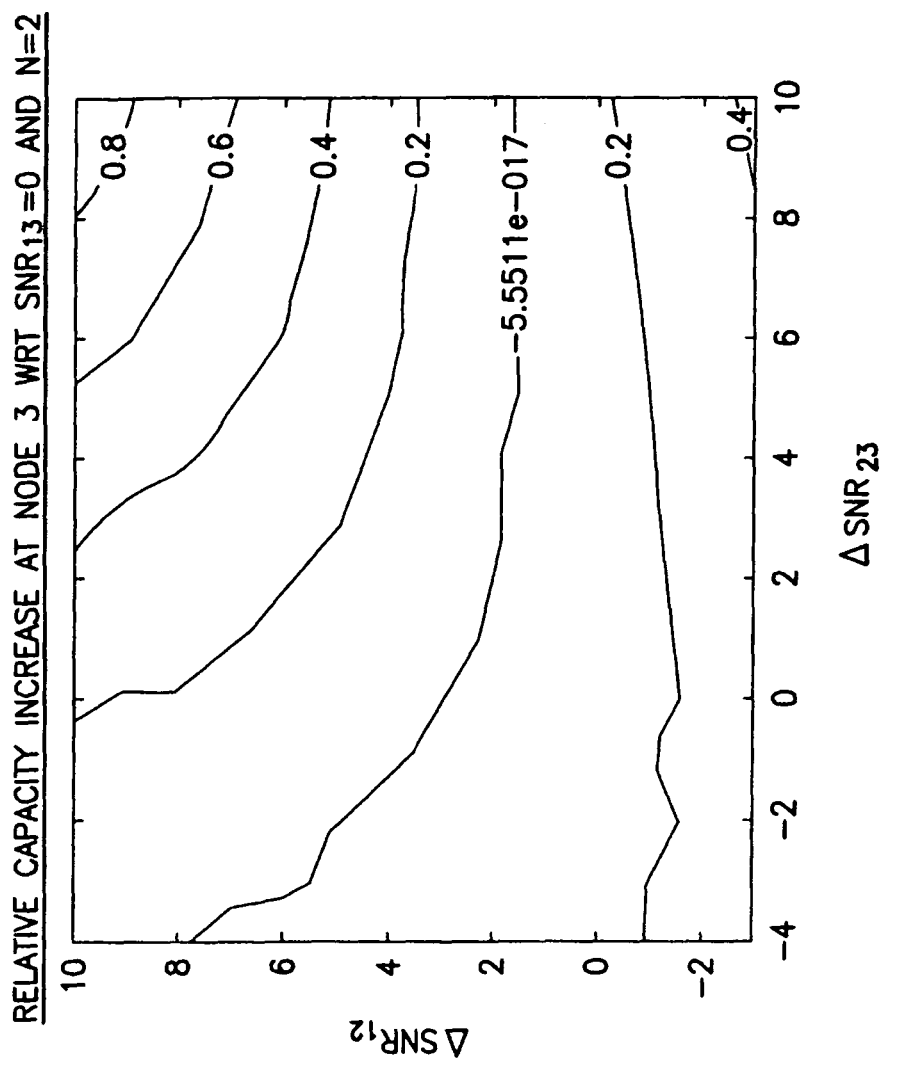
FIG. 3 is a graph that illustrates a capacity increase for a case of a direct path with one relay, where the x-axis and the y-axis designate SNR difference to direct path of 0 dB (single user case)
Figure 4:
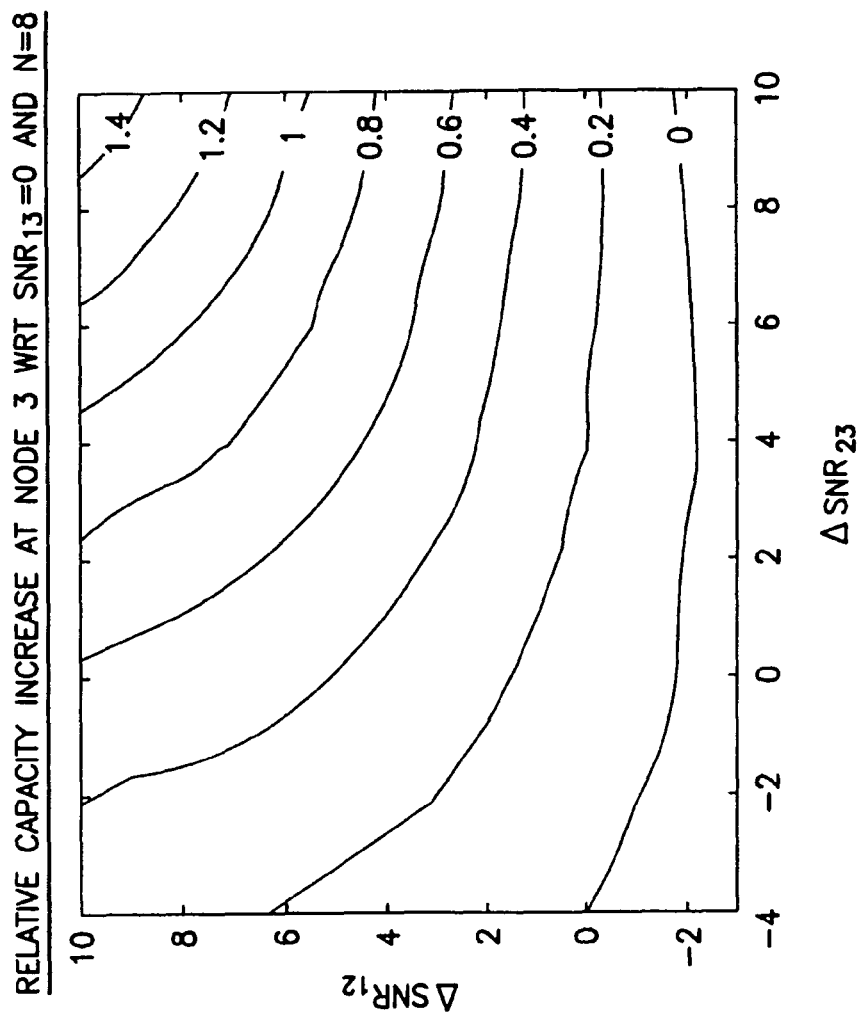
FIG. 4 is a graph that illustrates a capacity increase for a case of a direct path with seven relays, where the x-axis and the y-axis designate SNR difference to direct path of 0 dB (single user case)
Figure 5:
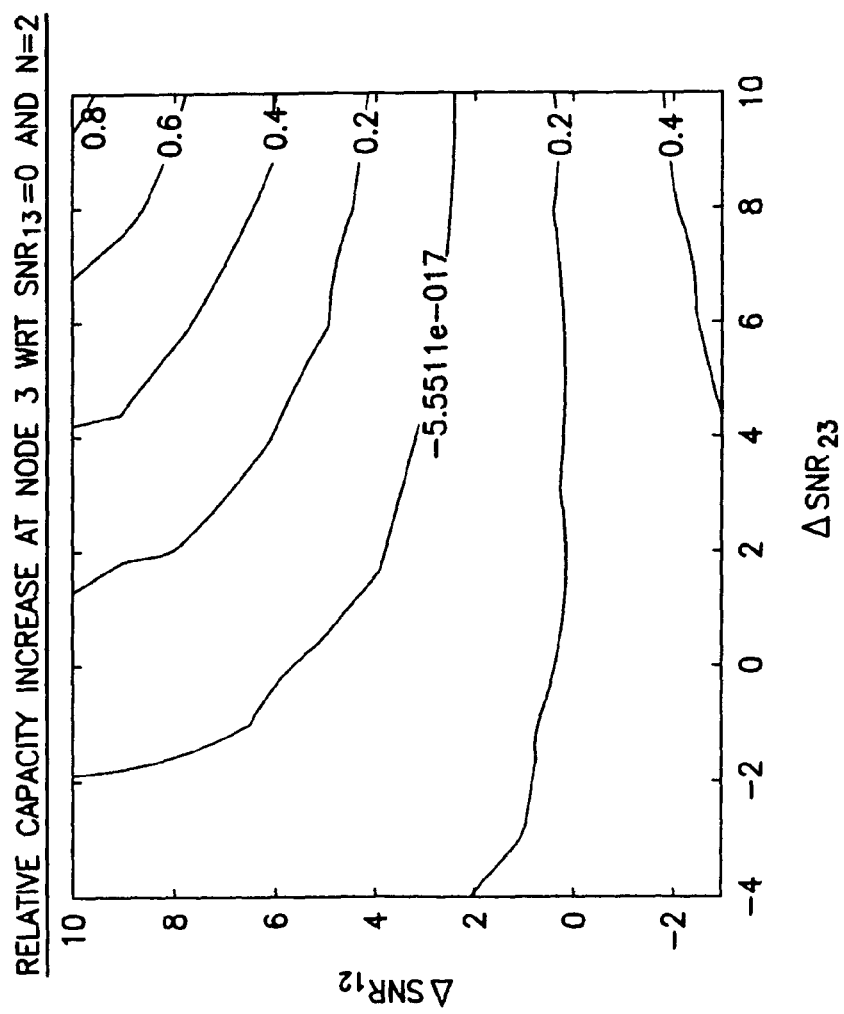
FIG. 5 is a graph that illustrates a capacity increase for a case of a direct path with one relay, where the x-axis and the y-axis designate SNR difference to direct path of 0 dB (optimal scheduling for two user case)
Figure 6:
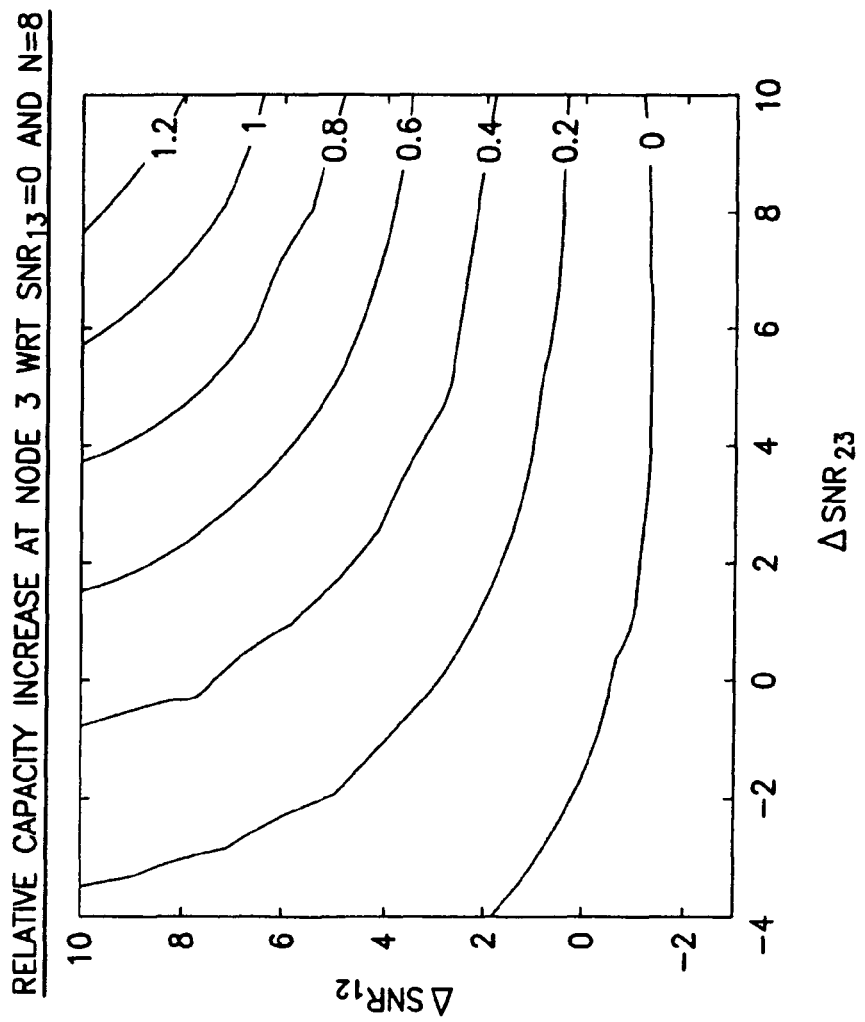
FIG. 6 is a graph that illustrates a capacity increase for a case of a direct path with seven relays, where the x-axis and the y-axis designate SNR difference to direct path of 0 dB (optimal scheduling for eight user case)
Figure 7:
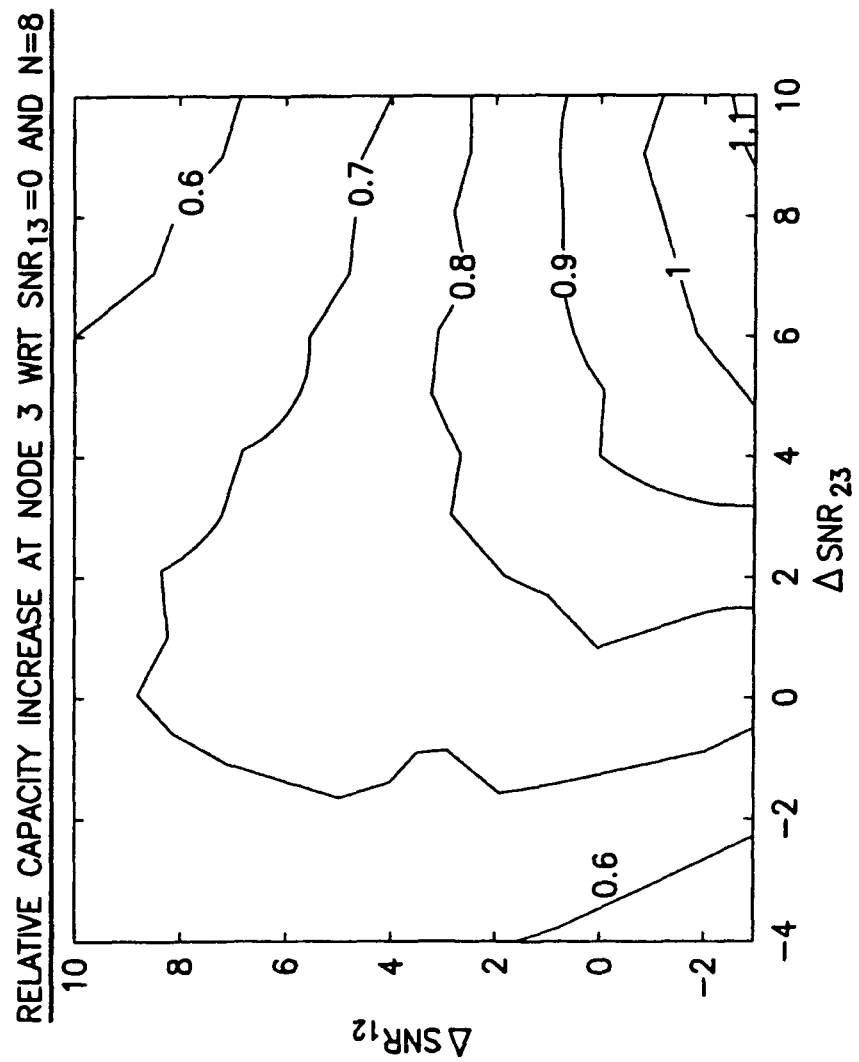
FIG. 7 is a graph that illustrates a capacity increase due to scheduling with randomized beamforming, when compared to conventional relaying with seven relays and one direct signal.

FIGS. 3 and 4 consider relative capacity improvement when only one source is present, and that source is activated when the channel power is highest at the destination. FIGS. 5 and 6 consider a relative capacity improvement when multiple sources are present, and where source activation is dictated by an assignment algorithm. Thus, the latter case may be considered to represent a fair scheduling solution having somewhat smaller (single-user) capacity than the single user case. FIG. 7 shows the benefit of randomized relaying in comparison to deterministic relaying.

It is noted that, in general, the SNR of the link between the source and the relay is assumed to be sufficiently high in order to ensure that the relay does not reduce system capacity.

Those configurations where the relays are useful, in comparison with direct transmission with the same total power, are shown in areas where the capacity increase (with respect to direct transmission) is positive. It is seen that the operational range of the embodiments of the invention increases significantly when the number of relays is increased. This is due to the randomization effect (beamforming gain), that is, since the signal power combines coherently, individual links may be relative poor.

Elsewhere, a model has been proposed for delay-differentiated scheduling under incomplete channel information at the receiver. Specifically, whenever the scheduling decision is made, the channel state is assumed to be known to the scheduler. However, the future channel states are not known. Assuming a time-correlated channel, however, the proposed scheduling model can perform well from the point of view of accomplishing short term fairness across transmitters with different delay-preferences. Above, the scheduler was assumed to know the pseudo-random channel mode. In the absence of complete information, the model can be applied to enforce efficient fair scheduling in a time-varying relay network where the receiver only has the current channel information. The solution to scheduling under incomplete information can be compared to one with complete information (equations (12)-(16)). Such a comparison reveals the value of channel information at the receiver.

Figure 9:
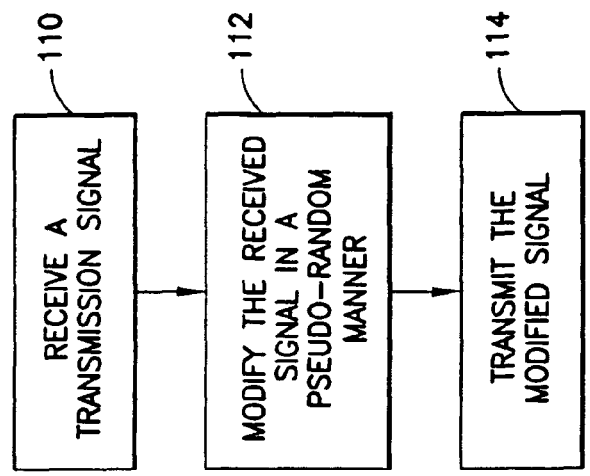
FIG. 9 depicts a flowchart illustrating one non-limiting example of a method for practicing the exemplary embodiments of this invention.

FIG. 9 depicts a flowchart illustrating one non-limiting example of a method for practicing the exemplary embodiments of this invention. In box 110, a transmission signal is received. In box 112, the received transmission signal is modified in a substantially pseudo-random manner to generate a time-varying signal. In box 114, the generated time-varying signal is transmitted.

In other embodiments, the received transmission signal may be modified in accordance with a pattern. In further embodiments, the received transmission signal may be modified in a cyclostationary manner. In other embodiments, the time-varying signal may be transmitted in a same frequency band as the transmission signal and the transmitted time-varying signal may be separated in time from the transmission signal. In further embodiments, the time-varying signal may be transmitted in a same frequency band as the transmission signal and the transmitted time-varying signal may be separated in space from the transmission signal. In other embodiments, the method may further include scheduling a transmission of the transmission signal using a scheduling unit. In further embodiments, the transmission signal and the transmitted time-varying signal may be in substantially orthogonal channels.

Based on the foregoing description it should be apparent that a novel relaying technique has been provided for in-band relay networks. The randomized relaying is shown to be beneficial when used in conjunction with channel-aware scheduling schemes. Such scheduling concepts are currently widely used in third generation (3G) wireless communications networks, and are envisioned for use with other networks as well. Thus, the enabling techniques are already defined for many wireless networks. It can be noted that the exemplary embodiments of this invention are also applicable as a diversity resource, e.g., for broadcast services, allowing the realization of a denser relay (gap-filler) network, e.g., for DVB-H, or for similar systems.

Various modifications and adaptations may become apparent to those skilled in the relevant arts in view of the foregoing description, when read in conjunction with the accompanying drawings. As but some examples, the use of other numbers of relays, and other scheduling algorithms, may be attempted by those skilled in the art.

Further, it should be noted that the concept of in-band relaying may be employed for only some of the various embodiments of this invention, and that the exemplary embodiments of this invention pertain as well to other relaying schemes (e.g., half duplex using separate time slots, frequency bands and so forth). More specifically, non-limiting examples include the use of frequency offsets at relay nodes, as well as providing for the randomization pattern to be controlled by an external agency (e.g. destination, source), as well as having the power and node selection (that is, which relays are part of the network) controlled by an external agency. Further, the teachings in accordance with the exemplary embodiments of this invention provide new randomization techniques, such as one having time-varying power at the relay, combined perhaps with the use of time-varying phase, and matrix valued-randomizations at the relay node output (when the relay has multiple transmit antennas).

It should thus be apparent that the exemplary embodiments of this invention provide for the use of different randomization techniques, some of which are beneficial from the destination point of view (such as those that control the signal fading via different sweep step sizes), and generically new randomization techniques that, for example, may employ power variation. These embodiments as well provide techniques to cause relay nodes to operate fairly for users in different locations with respect to the relay nodes, such as by, as a non-limiting example, swapping or exchanging relay node randomization sequences.

Based on the foregoing description it can be appreciated that the exemplary embodiments of this invention relate to a wireless communication system, method, device and computer program product where at least one relay node is interposed between at least one source node and at least one destination node, and varies a transmission signal to generate a time-varying received signal at the destination node. The transmission signal may be varied pseudo-randomly, and may be varied in a cyclostationary manner, and the induced cyclostationarity may be used to schedule the transmission in, for example, frequency, subcarrier and/or time so that the signal is transmitted when the received effective signal quality is high. The wireless communication system, method, device and computer program product may be employed to advantage with an in-band relay node, but are not limited for use with only an in-band relay node.

With regard to "in-band relaying", it is noted that one may retransmit at the relay in the same frequency band wherein the relay receives provided that the transmission is separated in time or space (e.g., the DVB-H case). The foregoing discussion has dealt primarily with the space-division case, where the destination receives essentially simultaneously the signal from the source and from relays. However, this type of operation should not be viewed as a limitation upon the practice of this invention. For example, an out-of-band relay uses a different frequency channel (different from the received frequency channel) at the relay node output.

It should be noted that a relay node may be stationary or mobile. Still further, the relay node may be a dedicated relay node, or it may instead be some transceiver in the communication network that operates in the relay mode when not fully occupied with other tasks. Note that a communication terminal, such as a cellular telephone, that at least sends a signal to a relay node may also perform scheduling (see, for example, the above-noted publication co-authored by the inventor: T. Heikkinen, T. Karageorgos and A. Hottinen, "Distributed scheduling in a Time-Varying Channel", in *Proc. VTC* 2005, Stockholm, Sweden, May 2005). In general, scheduling may refer to source node scheduling or relay node scheduling. Note further that the exemplary embodiments of this invention do not require that the relay node have multiple transmit/receive antennas. As may be appreciated based on the foregoing description, a plurality of relay nodes together may form an array, in a distributed manner.

The various embodiments of this invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It should be appreciated that all such and similar modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A relay node for being interposed between at least one source node and at least one destination node, comprising:

a data processor; and
a memory storing computer program code, the memory and the computer program code being configured to, with the data processor, cause the relay node at least to perform:
receive a transmission signal from the at least one source node; and
modify the received transmission signal in a substantially pseudo-random manner to generate a time-varying signal that is to be transmitted by the relay node to the at least one destination node, wherein a complex channel $h_{23}$ between the relay node (node 2) and the at least one destination node (node 3) is modified at a time slot t to:

$$\tilde{h}_{23}[t]=\sqrt{p_2[t]}w_2[t]h_{23}$$

where $p_2[t]$ is a transmit power of the relay node and $w_2[t]$ is a unit-power complex-valued coefficient applied at the relay node.

2. The relay node of claim 1, wherein the relay node comprises an in-band relay node.

3. The relay node of claim 1,
wherein the relay node is a first relay node (node 2),
wherein the time-varying signal is a first time-varying signal,
wherein a second relay node (node 4) comprising a receiver, a transmitter and a control unit receives the transmission signal transmitted by the at least one source node,
wherein the control unit of the second relay node modifies the received transmission signal in a substantially pseudo-random manner to generate a second time-varying signal that is transmitted by the second relay node to the at least one destination node, and
wherein a complex channel $h_{43}$ between the second relay node (node 4) and the at least one destination node (node 3) is modified at a time slot t to:

$$\tilde{h}_{43}[t]=\sqrt{p_4[t]}w_4[t]h_{43}$$

where $p_4[t]$ is a transmit power of the second relay node and $w_4[t]$ is a unit-power complex-valued coefficient applied at the relay node.

4. The relay node of claim 3, wherein $p_2[t] \neq p_4[t]$.

5. The relay node of claim 4, wherein $w_2[t] \neq w_4[t]$.

6. The relay node of claim 3, wherein $w_2[t] \neq w_4[t]$.

7. The relay node of claim 1, wherein there is a plurality of relay nodes, wherein a k th relay node modifies the transmission signal at slot/symbol t with a k,t th element of a matrix W, wherein each relay node of the plurality of relay nodes has knowledge of its corresponding row in the matrix.

8. The relay node of claim 7, wherein at least two matrix elements of the matrix W are different for at least two subcarriers.

9. The relay node of claim 1, wherein the relay node comprises a plurality of transmit antennas.

10. The relay node of claim 1, wherein a relay input signal and a relay output signal are in substantially orthogonal channels.

11. The relay node of claim 1, wherein the transmission signal is modified by the control unit in the substantially pseudo-random manner in accordance with a pattern.

12. The relay node of claim 11, wherein the pattern is controlled by an external agency.

13. The relay node of claim 1, wherein the substantially pseudo-random manner comprises time-varying a transmission power at the at least one relay node.

14. The relay node of claim 13, wherein the substantially pseudo-random manner further comprises time-varying a phase of the transmitted signal.

15. The relay node of claim 1, wherein the transmission signal is varied in a cyclostationary manner.

16. The relay node of claim 1, wherein the relay node comprises a transceiver that operates in a relay mode when not fully occupied with other tasks.

17. The relay node of claim 1, wherein the relay node operates half duplex using at least two time slots.

18. The relay node of claim 1, wherein the relay node operates half duplex using at least two frequency bands.

19. The relay node of claim 1, wherein at least one frequency offset is utilized at the relay node.

20. The relay node of claim 19,
wherein the relay node is a first relay node,
wherein the time-varying signal is a first time-varying signal,
wherein the at least one frequency offset is a first frequency offset,
wherein a second relay node comprising a receiver, a transmitter and a control unit receives the transmission signal transmitted by the at least one source node,
wherein the control unit of the second relay node modifies the received transmission signal in a substantially pseudo-random manner to generate a second time-varying signal that is transmitted by the second relay node to the at least one destination node,
wherein a second frequency offset is utilized at the second relay node, and
wherein the first frequency offset is different from the second frequency offset.

21. The relay node of claim 1, wherein power selection is controlled by an external agency.

22. The relay node of claim 1, wherein node selection is controlled by an external agency.

23. The relay node of claim 1, wherein at least one transmission channel parameter is determined by a scheduling unit.

24. The relay node of claim 1, wherein at least one scheduling criterion is utilized to schedule the transmission of the transmission signal.

25. The relay node of claim 24, wherein the scheduling of the transmission signal comprises temporal scheduling.

26. The relay node of claim 25, wherein the scheduling of the transmission signal further comprises frequency scheduling.

27. The relay node of claim 24, wherein the scheduling of the transmission signal comprises frequency scheduling.

28. The relay node of claim 1, wherein proportionally fair scheduling is employed.

29. The relay node of claim 1, wherein delay-differentiated scheduling is employed.

30. The relay node of claim 1, wherein an assignment algorithm is employed.

31. The relay node of claim 1, wherein at least one transmission channel parameter is signaled to the at least one source node from the at least one destination node.

32. The relay node of claim 31, wherein the relay node is enabled to decode the signaled at least one transmission channel parameter and wherein the relay node is enabled to modulate a transmit power of the relay node in response to the decoded signaled at least one transmission channel parameter.

33. The relay node of claim 1, wherein at least one control signal is utilized to determine an activity value of the relay node.

34. A relay node for being interposed between at least one source node and at least one destination node, comprising:
  a data processor; and
  a memory storing computer program code, the memory and the computer program code being configured to, with the data processor, cause the relay node at least to perform:
  receive a transmission signal transmitted from the at least one source node; and
  modify the received transmission signal to generate a time-varying signal that is to be transmitted by the relay node to the at least one destination node,
  wherein a complex channel $h_{23}$ between the relay node (node 2) and the at least one destination node (node 3) is modified at a time slot t to:

$$\tilde{h}_{23}[t] = \sqrt{p_2[t]} w_2[t] h_{23}$$

where $p_2[t]$ is a transmit power of the relay node and $w_2[t]$ is a unit-power complex-valued coefficient applied at the relay node, and
wherein factors $\sqrt{p_2[t]} w_2[t]$ are selected such that a received signal power is made to combine coherently at the at least one destination node and a received noise power is made to combine incoherently at the at least one destination node.

35. A relay device comprising: control means coupled to receiver means and transmitter means, said control means for modifying a received signal in a substantially pseudo-random manner to generate a time-varying signal that is to be transmitted by the transmitter means, wherein a complex channel $h_{23}$ between the relay device (node 2) and at least one destination node (node 3) is modified at a time slot t to:

$$\tilde{h}_{23}[t] = \sqrt{p_2[t]} w_2[t] h_{23}$$

where $p_2[t]$ is a transmit power of the relay device and $w_2[t]$ is a unit-power complex-valued coefficient applied at the relay device.

36. The relay node of claim 35, wherein factors $\sqrt{p_2[t]} w_2[t]$ are selected such that a received signal power is made to combine coherently at the at least one destination node and a received noise power is made to combine incoherently at the at least one destination node.

37. A wireless communication system comprising a plurality of relay nodes interposed between at least one source node and at least one destination node, wherein each relay node of the plurality of relay nodes comprises a data processor and a memory storing computer program code, the memory and the computer program code being configured to, with the data processor, cause the relay node at least to perform:
  receive a transmission signal; and
  modify the received transmission signal in a substantially pseudo-random manner to generate a time-varying signal that is to be transmitted by the relay node performing the modification, wherein the relay node comprises an in-band relay node, wherein a complex channel $h_{23}$ between the relay node (node 2) and the at least one destination node (node 3) is modified at a time slot t to:

$$\tilde{h}_{23}[t] = \sqrt{p_2[t]} w_2[t] h_{23}$$

where $p_2[t]$ is a transmit power of the relay node and $w_2[t]$ is a unit-power complex-valued coefficient applied at the relay node.

38. The wireless communication system of claim 37, wherein a relay input signal and a relay output signal are in substantially orthogonal channels.

39. A method for relaying a signal comprising:
  receiving, by a relay node, a transmission signal from at least one source node, wherein the relay node is interposed between the at least one source node and at least one destination node; and
  modifying, by the relay node, the received transmission signal in a substantially pseudo-random manner to generate a time-varying signal that is to be transmitted by the relay node to the at least one destination node, wherein a complex channel $h_{23}$ between the relay node (node 2) and the at least one destination node (node 3) is modified at a time slot t to:

$$\tilde{h}_{23}[t] = \sqrt{p_2[t]} w_2[t] h_{23}$$

where $p_2[t]$ is a transmit power of the relay node and $w_2[t]$ is a unit-power complex-valued coefficient applied at the relay node.

40. The method of claim 39, wherein the received transmission signal is modified in a substantially pseudo-random manner in accordance with a pattern.

41. The method of claim 39, wherein the received transmission signal is modified in a cyclostationary manner.

42. The method of claim 39, further comprising: transmitting the time-varying signal.

43. The method of claim 42, wherein the transmission signal and the transmitted time-varying signal are in substantially orthogonal channels.

44. A non-transitory computer-readable medium storing program instructions, execution of the program instructions by a relay node resulting in operations comprising:
  receiving a transmission signal from at least one source node, wherein the relay node is interposed between the at least one source node and at least one destination node; and
  modifying the received transmission signal in a pseudo-random manner to generate a time-varying signal that is to be transmitted by the relay node to the at least one destination node, wherein a complex channel $h_{23}$ between the relay node (node 2) and the at least one destination node (node 3) is modified at a time slot t to:

$$\tilde{h}_{23}[t] = \sqrt{p_2[t]} w_2[t] h_{23}$$

where $p_2[t]$ is a transmit power of the relay node and $w_2[t]$ is a unit-power complex-valued coefficient applied at the relay node.

45. The computer-readable medium of claim 43, wherein the received transmission signal is modified in a cyclostationary manner.

46. The computer-readable medium of claim 43, execution of the program instructions resulting in operations further comprising: transmitting the time-varying signal.

47. The computer-readable medium of claim 46, wherein the transmission signal and the transmitted time-varying signal are in substantially orthogonal channels.

* * * * *